Figure 3:
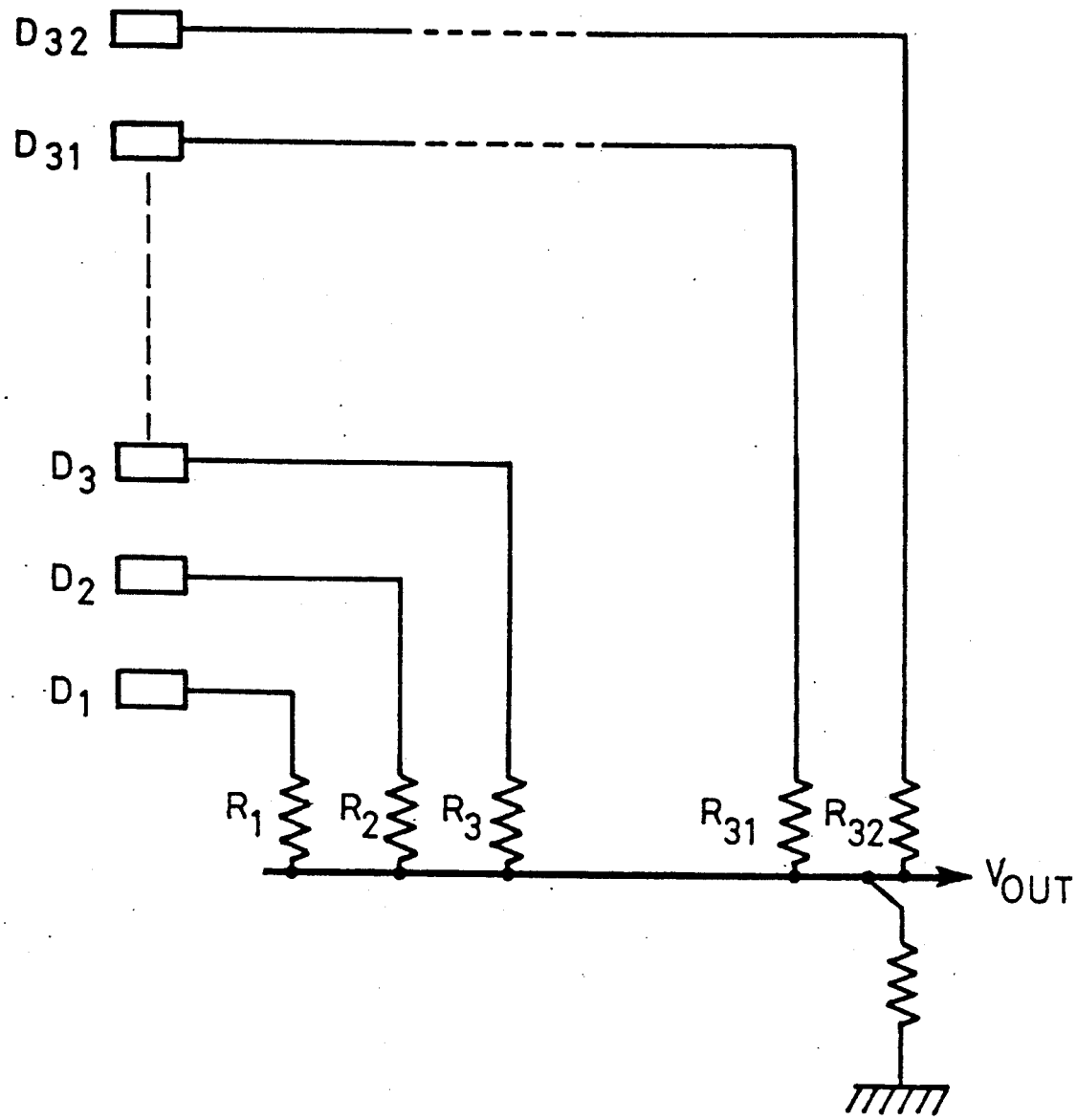

United States Patent [19]

Whitehouse

[11] Patent Number: 5,039,857

[45] Date of Patent: Aug. 13, 1991

[54] SCANNER FOR SIZING APPARATUS

[75] Inventor: John A. Whitehouse, Norfolk, United Kingdom

[73] Assignee: AEW Engineering Co. Limited, Norwich, England

[21] Appl. No.: 474,073

[22] PCT Filed: Oct. 7, 1988

[86] PCT No.: PCT/GB88/00843
§ 371 Date: Mar. 21, 1990
§ 102(e) Date: Mar. 21, 1990

[87] PCT Pub. No.: WO89/03286
PCT Pub. Date: Apr. 20, 1989

[30] Foreign Application Priority Data

Oct. 8, 1987 [GB] United Kingdom ............... 8723648

[51] Int. Cl.$^5$ ..................... G01J 33/12; G01J 21/84
[52] U.S. Cl. ............................... 250/360.1; 250/560; 250/349; 250/341; 83/75

[58] Field of Search ................ 83/73, 79, 78; 200/338.1, 341, 347, 560; 306/381; 250/360.1

[56] References Cited

FOREIGN PATENT DOCUMENTS 2936106 3/1980 Fed. Rep. of Germany .
1507683 4/1978 United Kingdom .
2149650 6/1985 United Kingdom .

Primary Examiner—Carolyn E. Fields
Assistant Examiner—Drew A. Dunn
Attorney, Agent, or Firm—Lee, Mann, Smith, McWilliams & Sweeney

[57] ABSTRACT

In apparatus for sizing and bandsaw cutting of meat, the product is conveyed in a rotary path over a table (18) equipped with a radial line of inspection devices (22), the output signals of which are processed to detect the area of the product moving over the table, and the signal output from the inspection devices are weighed to compensate for the greater path length travelled by radially outer regions of the product.

19 Claims, 3 Drawing Sheets

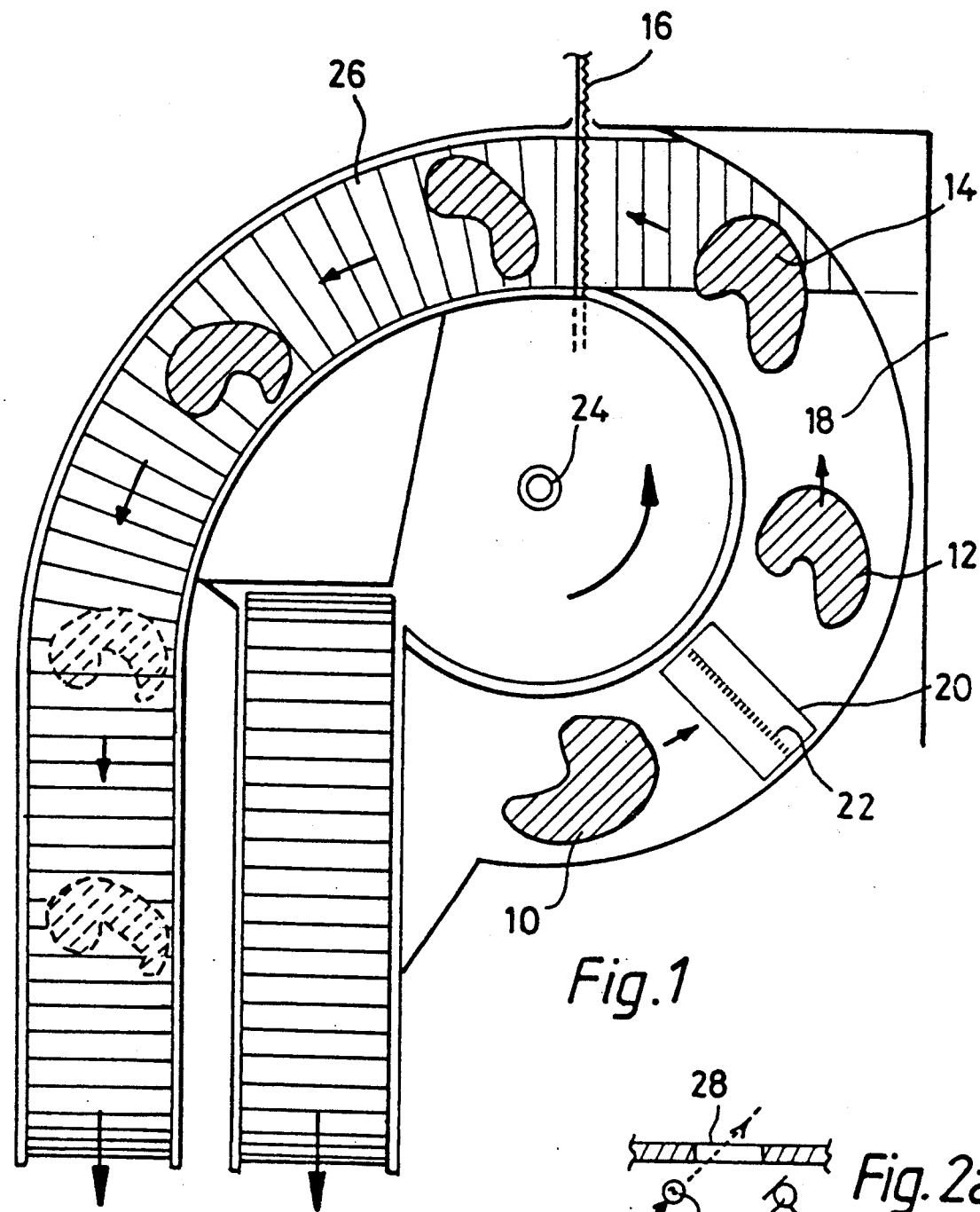
Fig.1
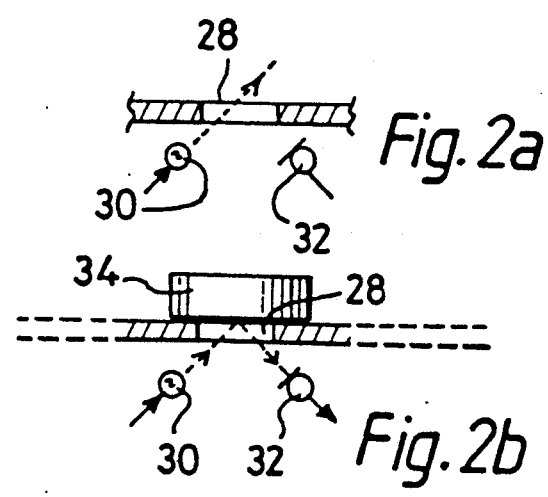
Fig.2a
Fig.2b

SCANNER FOR SIZING APPARATUS

FIELD OF THE INVENTION

This invention concerns scanners for sizing apparatus and in particular a radial scanner by which irregular shaped product can be measured for area sizing purposes before a portion is cut from the end which has been scanned.

BACKGROUND OF THE INVENTION

British Patent Specification No. 2149650 describes sizing apparatus in which the area of a piece of meat or like product which is to have pieces removed from the end face thereof by a band saw is measured by scanning linearly in a direction perpendicular to the direction of movement of the meat as it passes a scanning head.

The arrangement requires the meat to be supported in an unconventional manner and also requires the band saw to be operating in a vertical sense. Development of the machine has dictated that the meat should traverse with the cut face horizontal so as to be engaged by the horizontal section of a band saw and this requires that the end face of the meat shall be measured as it passes over a cutting table.

The development of the machine has also dictated that the meat is moved around a circular path in a magazine and the radius of the circular path is such that the meat cannot be considered to move in a straight line past a radial line of scanning windows.

It is therefore an object of the present invention to provide a scanner by which an accurate measurement of the area of the product can be obtained.

SUMMARY OF THE INVENTION

According to the present invention in apparatus for measuring the area of the end face of a piece of product which is to be cut by a band saw, and in which the product is supported on a horizontal surface of a cutting table as it is moved therearound in a generally circular path for engagement with the cutting edge of the saw blade, a line of inspection devices is arranged along a radius of the circular path in advance of the cutting position, and the line of inspection devices is addressed repetitively so as to produce electrical signals depending on whether product is positioned above the windows or not, and the electrical signals are combined in an electrical circuit and weighted by the circuit depending on the position of the detector along the radial line from which the signal is derived, greater weighting being given to signals arising from detectors located radially further from the centre of rotation than from detectors located nearer to the centre of rotation.

Typically the detectors are infra-red sensitive semiconductor junctions and each is associated with an infra-red source such as a light emitting diode which is arranged to direct infra-red radiation through a window at an angle of approximately 45° to the phase of the window. If product exists on the other side of the window, some of the infra-red radiation is reflected by the surface of the product to pass once again through the window but this time at 90° to the direction of the incident radiation and if a semiconductor detector junction is located at an appropriate position on the opposite side of the window, the reflected radiation will be received by the detector and thereby cause an increase in the current flowing therethrough.

The use of an infra-red radiation source and the use of infra-red sensitive detectors reduces the sensitivity of the device to changes in ambient lighting.

According to a preferred feature of the invention, the transmitters and detectors are located on opposite sides of each window below the opaque material surrounding each window and preferably cannot be viewed directly except at angles of very shallow incidence through the window. In this way incident infra-red and light radiation generally incident on the window will not penetrate and be seen by the detector.

By locating detectors and transmitters side by side so the windows can be positioned very close to one another and in a preferred arrangement, 32 pairs of transmitters and detectors are located along a line approximately 15 centimeters long.

In a preferred arrangement, the output current from each of the detectors is supplied via a summing resistor to a summing amplifier and the latter is set to produce an output signal whose value is dependent on the number of junctions producing their full output current.

In order to introduce a weighting as between radially outer and radially inner detectors (to compensate for the greater path length travelled by outer regions of the meat as relative to inner regions of the meat the latter passes over the detector); the summing resistors associated with the different detectors are decrease in value from the radially inboard to the radially outboard end of the line of detectors, so that whereas each of the detectors is designed to produce the same EMF when product obscures the window associated with that detector, the output current which flows in response to the covering of that particular window will be greater if the window is nearer the outboard end of the line and smaller if it is nearer the inboard end of the line.

The net effect is that if a number of windows toward the radially outboard end of the line of detectors are covered by product then a greater current flows in the output of the summing amplifier than will be the case if a corresponding number of windows are covered by product towards the inboard end of the line of detectors.

As the product passes around the circular path, so different ones of the windows are covered and then exposed again as the product passes and by sampling the output of the summing amplifier at a high repetition rate, so a very accurate area signal can be obtained by simply integrating the sampled values of the output signal.

Figure 4A:
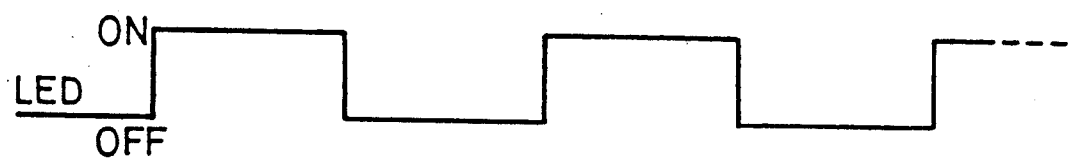
Figure 4B:
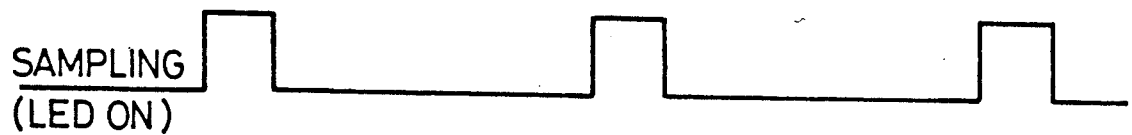

The invention will now be described by way of example with reference to the accompanying drawings in which FIG. 1 is diagrammatic plan view from above of a cutting station in a meat cutting machine incorporating a linear detector in accordance with the invention, FIG. 2a and FIG. 2b show to an enlarged scale one of the windows in the line of windows of the linear detector, FIG. 3 shows the input of the summing circuit, and FIG. 4 is a timing diagram showing the pulses supplied to the light emitting diodes and the sampling pulses for sensing the detector output.

In FIG. 1, pieces of meat from which chops are to be cut are designated by reference numerals 10, 12, 14 and a band saw is denoted by reference numeral 16 with a horizontal section of the band saw extending across and parallel to the horizontal surface of a cutting table 18.

Within the surface of the cutting table is located a removeable plate 20 containing a line of thirty two circular windows generally designated 22 stretching along the longer dimension of the plate and which, when the plate is in position extends radially relative to the centre of rotation 24 about which the pieces of meat are rotated by a magazine (not shown) when the machine is operating.

Severed pieces of meat typically in the form of chops, are removed by a delivery conveyor 26.

The plate is shown in cross-section in FIGS. 2a and 2b and one of the windows in the line of windows 22 is shown in FIG. 2a at 28.

In FIG. 2a, no product is shown above the window and infra-red-radiation from a light emitting diode 30 passes straight through the window 28 and is not reflected to a sufficient extent to produce any increase in the output current of the semiconductor detector 32. The latter is also located below the window 28 as is the source 30, but is sensitive only to radiation incident thereon at an angle substantially perpendicular to the direction of radiation leaving the source 30, so that there is little or no chance of radiation leaving the source 30 and directly impinging on the detector 32.

However if product 34 is located above the window 28, radiation from the transmitter or source 30 is reflected by the product and will impinge on the detector 32 at just the right angle so as to cause its output current to rise. The apparatus can be set up so that a sufficient change in output current is obtained in the presence of the material as to produce a useful output signal to indicate the presence of product immediately above the window concerned.

By using similar detectors 32, the emf generated by the impinging radiation will be the same position along the line of detectors 22 irrespective of the position of the window therealong. The emf from each detector can be employed to generate an output current which can in time be through of as a incremental measure of length along the line of detectors, and if for example half of the line is covered by product, the number of detectors producing output currents will be equal to half the number of detectors along the line, and a summation of the output current will correspond to one half the maximum of the output current available (if all detectors were covered by product).

In a similar manner if all of the line of windows is covered, a maximum value output signal is obtained and if none of the windows are covered the output signal will be effectively zero.

In order to add weight to signals arising from radially outboard detectors relative to radially inboard windows, different summing resistors can be used for the different detectors. In this way a greater current will flow from a detector located radially further away from the centre of rotation than from a detector located nearer to the centre of rotation.

FIG. 3 illustrates the summing resistors and detectors and shows how an analogue output voltage can be obtained whose instantaneous value is dependent on the number and position of the detectors which have been covered by the product.

By sampling and integrating the analogue output voltage from the summing circuit as the product passes over the line of windows 22, so an overall electrical signal can be obtained whose magnitude is proportional to the area of the face of the product which has moved over the line of detectors 22.

The precise values for the different summing resistors can be found by experiment.

FIG. 4 is a timing diagram. FIG. 4a shows the time periods during which the light emitting diode is on and off. Emission occurs when the signal at 4a is high.

Two series of sampling pulses are employed, 180° out of phase with one another to produce two output signals from each detector. The first series of sampling signals is shown at 4b and it will be noted that here the pulses occur within the periods during which the light emitting diode associated with the detector is "on" and therefore emitting.

The second series of sampling pulses occur 180° out of phase and coincide with the "off" periods of the light emitting diode associated with the detector.

Figure 4C:

Ambient light can now be effectively eliminated from the output signal by subtracting any signal obtained during a sampling pulse of FIG. 4c from output signal which has been obtained during our adjacent sampling pulse occurring along line 4b. This subtraction eliminates any output signal component which is present during both sampling pulse periods and enables a true output signal to be obtained resulting solely from the reflection of infra-red radiation from the associated transmitting light emitting diode due to the presence of product above that detector window.

I claim:

1. In apparatus for measuring the area of the end face of a piece of product which is to be cut by a band saw, and in which the product is supported on a horizontal surface of a cutting table as it is moved therearound in a generally circular path for engagement with the cutting edge of the saw blade, a line of inspection devices is arranged along a radius of the circular path in advance of the cutting position, the line of inspection devices is addressed repetitively so as to produce electrical signals depending on whether product is positioned above the inspection devices or not, and the electrical signals are combined in an electrical circuit and weighted by the circuit depending on the position of the inspection devices along the radial line from which the signal is derived, greater weighting being given to signals arising from devices located radially further from the centre of rotation than from devices located nearer to the centre of rotation, in which the electrical signals from each of the inspection devices are supplied via a summing resistor to a summing amplifier and the latter is set to produce an output signal whose value is dependent on the number of junctions producing their full output current, and in which, in order to introduce a weighting as between radially outer and radially inner inspection devices (to compensate for the greater path length travelled by outer regions of the product as relative to inner regions of the product the latter passes over the devices), the summing resistors associated with the different devices decrease in value from the radially inboard to the radially outboard end of the line of devices, so that whereas each of the devices is designed to produce the same EMF when product stimulates that device, the output current which flows in response to the stimulation of that particular device is greater if the device is nearer the outboard end of the line and smaller if it is nearer the inboard end of the line.

2. Apparatus according to claim 1, wherein the inspection devices comprise detectors in the form of infrared sensitive semiconductor junctions and each is associated with an infra-red source.

3. Apparatus according to claim 2, wherein each source is arranged to direct infra-red radiation through a window, in the horizontal surface of the table, at an angle of approximately 45° to the plane of the window.

4. Apparatus according to claim 3, wherein the sources and detectors are located on opposite sides of each window below the opaque material surrounding each window such that they cannot be viewed directly except at angles of very shallow incidence through the window.

5. Apparatus according to claim 3, wherein the detectors and sources are disposed side by side across the radial line so that the windows can be positioned very close to one another along the radial line.

6. Apparatus according to claim 1, wherein the output of the summing amplifier is sampled at a high repetition rate, and an accurate area signal is obtained by means for integrating the sampled values of the output signal.

7. In apparatus for measuring the area of the end face of a piece of produce which is to be cut by a band saw, and in which the product is supported on a horizontal surface of a cutting table as it is moved therearound in a generally circular path for engagement which the cutting edge of the saw blade, a line of inspection devices is arranged along a radius of the circular path in advance of the cutting position, wherein the inspection devices comprise detectors in the form of infra-red sensitive semiconductor junctions and each is associated with an infra-red source, each source being arranged to direct infra-red radiation through a window, in the horizontal surface of the table, at an angle of approximately 45° to the plane of the window, and in which the line of inspection devices is addressed repetitively so as to produce electrical signals depending on whether product is positioned above the inspection devices or not, and the electrical signals are combined in an electrical circuit and weighted by the circuit depending on the position of the inspection device along the radial line from which the signal is derived, greater weighting being given to signals arising from devices located radially further from the centre of rotation than from devices located nearer to the centre of rotation.

8. Apparatus according to claim 7, wherein the sources and detectors are located on opposite sides of each window below the opaque material surrounding each window such that they cannot be viewed directly except at angles of very shallow incidence through the window.

9. Apparatus according to claim 7, wherein the detectors and sources are disposed side by side across the radial line so that the windows can be positioned adjacent to one another along the radial line.

10. Apparatus according to claim 7, wherein the electrical signals from each of the inspection devices is supplied via a summing resistor to a summing amplifier and the latter is set to produce an output signal whose value is dependent on the number of junctions producing their full output current.

11. Apparatus according to claim 10, wherein, in order to introduce a weighing as between radially outer and radially inner inspection devices (to compensate for the greater path length travelled by outer regions of the product as relative to inner regions of the product the latter passes over the devices), the summing resistors associated with the different devices decreases in value from the radially inboard to the radially outboard end of the line of devices, so that whereas each of the devices is designed to produce the same EMF when product stimulates that device, the output current which flows in response to the stimulation of that particular device is greater if the device is nearer the outboard end of the line and smaller if it is nearer the inboard end of the line.

12. Apparatus according to claim 11, wherein the output of the summing amplifier is sampled at a high repetition rate, and an accurate area signal is obtained by means for integrating the sampled values of the output signal.

13. In apparatus for measuring the area of the end face of a piece of product which is to be cut by a band saw, and in which the product is supported on a horizontal surface of a cutting table as it is moved therearound in a generally circular path for engagement with the cutting edge of the saw blade, a line of inspection devices is arranged along a radius of the circular path in advance of the cutting position, the line of inspection devices is addressed repetitively so as to produce electrical signals depending on whether product is positioned above the inspection devices or not, and the electrical signals are combined in an electrical circuit and weighted by the circuit depending on the position of the inspection device along the radial line from which the signal is derived, greater weighting being given to signals arising from devices located radially further from the centre of rotation than from devices located nearer to the centre of rotation, in which the electrical signals from each of the inspection devices is supplied via a summing resistor to a summing amplifier and the latter is set to produce an output signal whose value is dependent on the number of junctions producing their full output current.

14. Apparatus according to claim 13, wherein the inspection devices comprise detectors in the form of infra-red sensitive semiconductor junctions and each is associated with an infra-red source.

15. Apparatus according to claim 14, wherein each source is arranged to direct infra-red radiation through a window, in the horizontal surface of the table, at an angle of approximately 45° to the plane of the window.

16. Apparatus according to claim 15, wherein the sources and detectors are located on opposite sides of each window below the opaque material surrounding each window such that they cannot be viewed directly except at angles of very shallow incidence through the window.

17. Apparatus according to claim 15, wherein the detectors and sources are disposed side by side across the radial line so that the windows can be positioned, adjacent to one another along the radial line.

18. Apparatus according to claim 13, wherein, in order to introduce a weighing as between radially outer and radially inner inspection devices (to compensate for the greater path length travelled by outer regions of the product as relative to inner regions of the product the latter passes over the devices), the summing resistors associated with the different devices decreases in value from the radially inboard to the radially outboard end of the line of devices, so that whereas each of the devices is designed to produce the same EMF when product stimulates that device, the output current which flows in response to the stimulation of that particular device is greater if the device is nearer the outboard end of the line and smaller if it is nearer the inboard end of the line.

19. Apparatus according to claim 18, wherein the output of the summing amplifier is sampled at a high repetition rate, and an accurate area signal is obtained by means for integrating the sampled values of the output signal.

* * * * *